July 7, 1959  A. D. FREIBERG  2,893,347
SCORE BOARD

Filed June 3, 1957  2 Sheets-Sheet 1

INVENTOR.
ALBERT D. FREIBERG
BY
Moses, Nolte & Nolte
ATTORNEYS

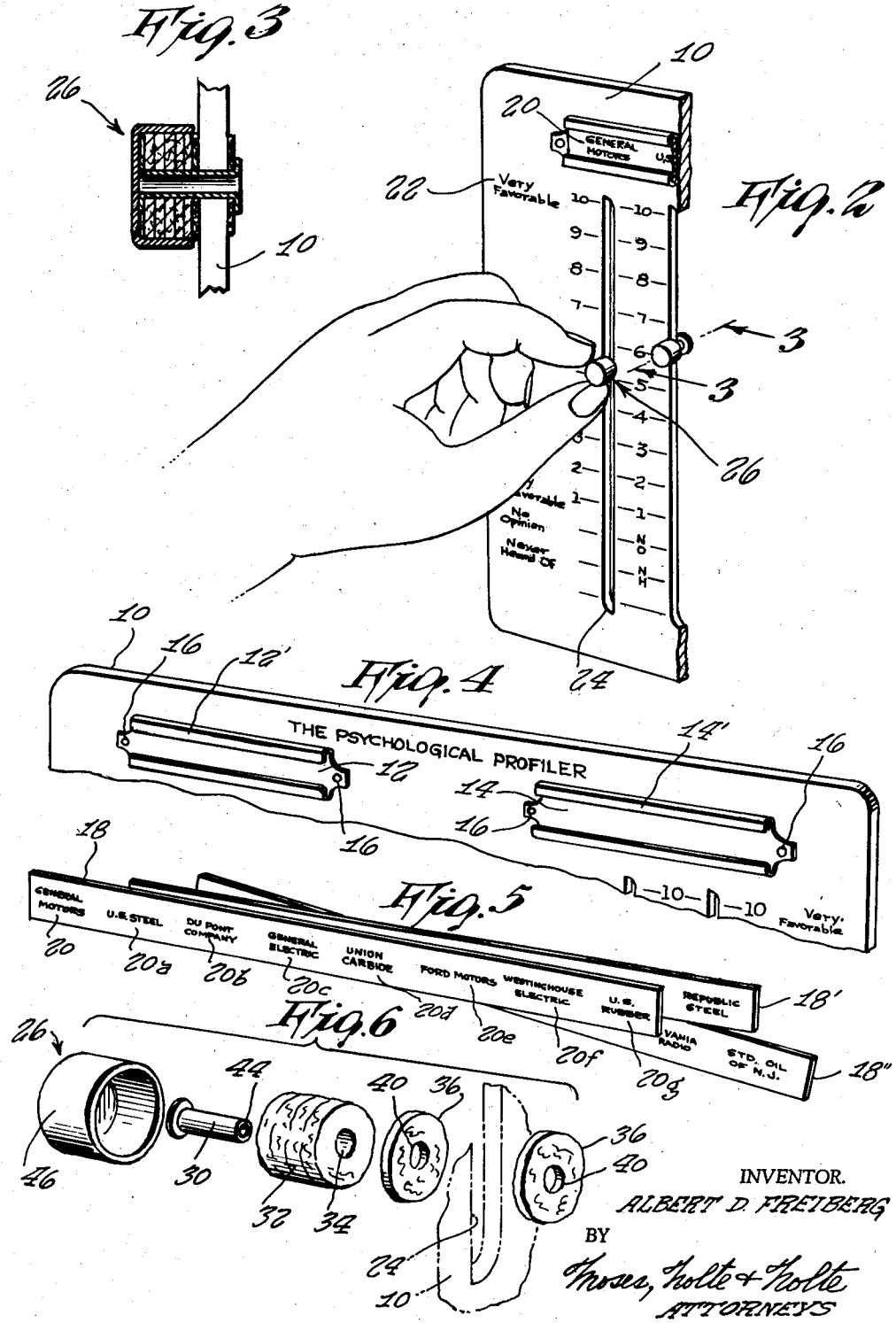

United States Patent Office 2,893,347
Patented July 7, 1959

2,893,347

SCORE BOARD

Albert D. Freiberg, Greenwich, Conn.

Application June 3, 1957, Serial No. 663,222

1 Claim. (Cl. 116—135)

This invention relates to charts and scoreboards and the like and particularly to a special score board.

The main object of my invention is to provide a score board or chart with a listing, for example, for listing commodities or industries and also to provide means for visually rating the individual commodities or industries so as to present a graphic chart capable of visual analysis.

Another object of this invention is to have such a score board or chart wherein the commodities, industries or other subjects of note, are assigned to individual columns on the board and also provided with individually manually movable indicators or the like for each column adapted to be shifted to various positions in the relative column to indicate individual opinions of the subject of said column.

An ancillary object of this invention is to have such a score board provided with a guide means individually assigned to each commodity or industry column, so that the indicators are shiftable along these guide means to the desired location along the same at will. With the indicators capable of individually retaining their attained positions in their respective guide means.

Other objects and advantages of my invention will appear in greater detail as the specification proceeds.

In order to facilitate ready comprehension of this invention, for a proper appreciation of the salient features thereof, the invention is illustrated on the accompanying drawings forming part thereof and in which:

Fig. 2 is a somewhat reduced scale fragmentary perspective view of the invention as illustrated in Fig. 1;

Fig. 3 is an enlarged fragmentary sectional view taken along the line 3—3 of Fig. 2;

Fig. 4 is a fragmentary perspective view of a portion of the invention illustrated in Fig. 1 with parts removed;

Fig. 5 is a perspective view of the parts of my invention removed from Fig. 4; and Fig. 6 is an exploded view of the parts illustrated in Fig. 3.

Throughout these views, the same reference numerals indicate the same or like parts and features.

Figure 1:
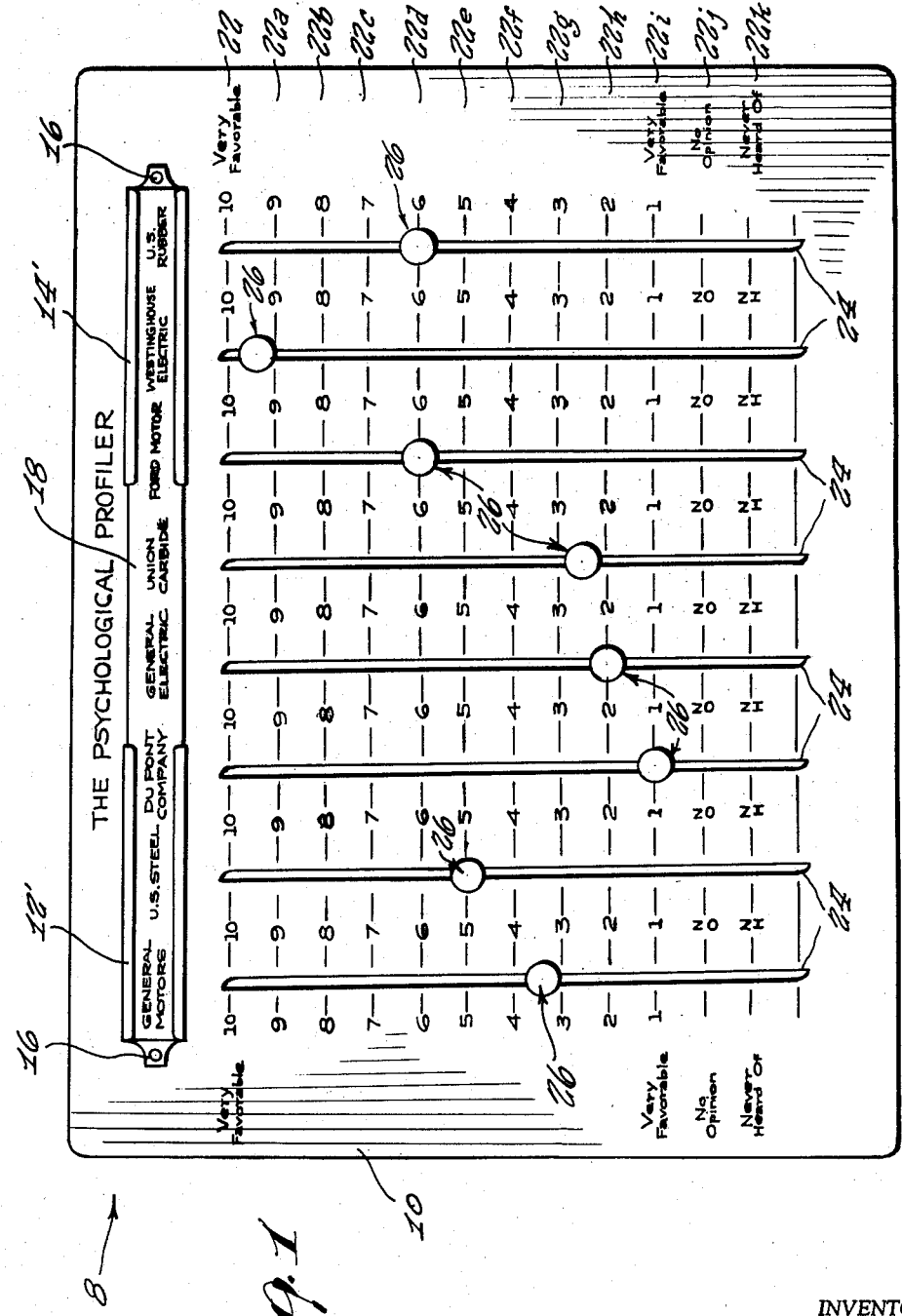
Fig. 1 is a front view of the score board made according to the invention and embodying the same in a practical form.

In the business world, it is frequently desirable to have a visual index of selected opinions in order to make accurate forecasts or decisions. In order to meet such actual needs, I have designed a special score board which, upon manual operation, automatically indicates to visual inspection a graphic representation of various opinions or values.

Hence, in the practice of my invention and referring also again to the drawings, a score board generally indicated at 8 (Fig. 1) includes a score board panel 10 (Fig. 4) having mounted thereon by means of screws 16, rivets or other suitable fastening devices, a pair of substantially horizontally aligned conventional brackets 12, 14. These brackets are adapted to receive between their flanges 12', 14' removable commodity or industry cards or chart 18 which is so constructed that it will slide laterally into and be retained by the brackets.

These reference cards 18, 18', 18" (Fig. 5) have listed thereon a horizontal series of industries or commodities indicated at 20–20$g$. As seen in Fig. 1, when the card 18 is inserted into the receiving brackets 12 and 14, the commodities 20 through 20$g$ form a series of sub-divisions extending horizontally across the length of the panel 10.

The score board panel 10 (Fig. 1) has mounted on its face a series of vertical sub-divisions indicated at 22–22$k$. The sub-divisions 22 through 22$i$ are arranged in number sequence so as to allow relative evaluation of a subject from 1 to 10. The panel also has a sub-division 22$j$ noted "No Opinion" and further a sub-division 22$k$ indicating "Never Heard Of." These sub-division markings are extended the full length of the board for convenience or rating individual subjects and also to facilitate visual analysis.

Running substantially vertically on the panel is a plurality of guide slots 24, cut through the panel and extending in each case from on the upper panel subdivision 22 to the lower sub-divisions 22$k$. These slots are so arranged so that one slot is provided for each of the commodities 20–20$g$ appearing on the card 18.

The score board is thus sub-divided into horizontal and vertical references so that the cooperation between the two can determine a visual reference chart.

In each slot 24, there is placed, by means to be hereinafter described, a movable indicator 26. By manual means, the indicator 26 may be slid up and down the slot 24 beneath each sub-division 20–20$g$ so that it will determine a reference point with regard to a rating of each subject on a card 18 with respect to a determined rating factor from the vertically positioned sub-division 22 through 22$k$.

It is understood that the ratings indicated could be well adapted to other uses than those indicated in 22 through 22$k$ and 20 through 20$g$ without departing from the spirit of this invention.

Referring now to Fig. 6, the indicator 26 includes a rivet 30, a bushing or cushion bearing 32 having an opening 34 through its center to receive rivet 30, and a pair of washers 36 adapted to be positioned one on either side of the panel 10.

Each washer 36 has an opening 40 so that when the indicator 26 is assembled, rivet 30 is passed through bearing opening 34, washer openings 40 and slot 24. After the indicator has been so assembled, the end 44 of rivet 30 is flattened by conventional means so as to compress the entire assembly so that washers 30 frictionally engage the opposite surfaces of panel 10. The bushing 32 acts as a compression member so that the indicator assembly 26, although gripping firmly panel 10, is capable of being slid up and down the guide slot 24 when manually operated as illustrated in Fig. 2.

A cap member 46 made of metal, plastic or any suitable material, is affixed over the bushing 32 and is itself removable without disturbing the indicator affixed to the board. In this way, various colors or other types of indicator caps could be substituted to provide any desired visual picture which might present an appearance capable of quicker recognition.

It is apparent from the foregoing, that opinion profiles may be obtained rating any selected subject, commodity or industry as against any desired reference factors.

I have described what I believe to be the best embodiments of my invention, I do not wish, however, to be confined to the embodiments shown, but what I desire to cover by Letters Patent is set forth in the appended claim.

What I claim is:

A score board of the character described including a score board panel, a reference card having printed thereon at least three indications of commodities, branches of industry and the like, a bracket for removably mounting said card to said panel so that said plurality of captions will be arranged in a horizontal series at the head of the panel, a vertical series of membered horizontal sub-divisions marked across said panel, panel wall means defining at least three substantially vertical elongated slots on the panel, each of said slots individually assigned to a caption and extending downwardly therefrom so as to intersect the horizontal reference sub-divisions, indicator means individually shiftable with respect to the elongated slots with one indicator movable with each caption, said indicator means including in each case an adjustable indicator, shiftable along one of the slots, said indicator means frictionally engaging opposite surfaces of said panel to be located in any numbered spaced portion in the vertical series at will, and each indicator including means for retaining said indicator in its attained position along said slots, said last-named means including a rivet extending through said slots, a bushing of resilient material positioned adjacent a face of said score board, a washer adjacent the opposite face, and a removable cap fitting over said bushing.

References Cited in the file of this patent

UNITED STATES PATENTS

| | | |
|---|---|---|
| 623,392 | Adams | Apr. 18, 1899 |
| 1,731,749 | Miller et al. | Oct. 15, 1929 |
| 2,687,705 | Cristenson | Aug. 31, 1954 |
| 2,794,642 | O'Neill | June 4, 1957 |
| 2,853,044 | Freiberg | Sept. 23, 1958 |

FOREIGN PATENTS

| | | |
|---|---|---|
| 849,637 | France | Aug. 21, 1939 |